3,303,178
POLYMERIZATION OF 4-METHYL PENTENE-1 IN THE PRESENCE OF AN AGED CATALYST CONSISTING OF AA-TiCl$_3$ AND DIETHYL ALUMINUM CHLORIDE
Gobichettipalayam S. Krishnamurthy, Silver Spring, Md., assignor to W. R. Grace & Co., New York, N.Y., a corporation of Connecticut
No Drawing. Filed Oct. 23, 1962, Ser. No. 232,587
2 Claims. (Cl. 260—93.7)

This invention relates to a novel polymer containing a high degree of crystallinity, to the improved method of making such, and to the catalyst system utilized therein. In particular it relates to a novel poly-4-methylpentene-1 and to the improved method and catalyst system used in the preparation thereof.

According to the known processes, poly-4-methylpentene-1 is produced by polymerizing the monomer in the presence of a catalyst composition composed of a transition metal halide, such as titanium trichloride, and a tri-alkyl aluminum compound such as tri-isobutyl aluminum. The resultant polymer possesses a low degree of crystallinity and can be further processed into films and fibers with desirable characteristics such as melting point, extensibility, and tensile strength approximating those of the other olefins. To produce the films and fibers of these desirable characteristics, however, it is necessary that the polymer undergo careful annealing for extended periods of time (for example, 8 hours at 226° C.), thereby making their commercial production economically unfeasible.

An object of this invention, therefore, is to provide a novel poly-4-methylpentene-1 of greater crystallinity from which films and fibers of superior quality can be made directly without the necessity for the heretofore required annealing.

It is an additional object of this invention to provide an improved process for the manufacture of poly-4-methylpentene-1 of greater crystallinity. A further object of this invention is to provide a novel catalyst system useful for effecting a high degree of crystallinity in poly-4-methylpentene-1. Other objects, advantages, and features of this invention will be apparent to those skilled in the art in view of the following more detailed description of the invention.

Accordingly, in this invention it has been found that poly-4-methylpentene-1 of significantly increased crystallinity can be produced by aging an aluminum activated titanium trichloride and diethyl aluminum chloride catalyst (hereafter referred to as AA-TiCl$_3$+DEAC) in a small amount of an inert hydrocarbon solvent for a specified period of time and within a preferred temperature range prior to the injection of the catalyst into the monomer. The resulting polymer may then be molded into films or fibers, which also possess a higher pecentage of crystallinity than those presently known, without the necessity of a concomitant annealing step. This greatly reduces the time and cost of production, and, therefore, makes their manufacture economically desirable.

Specifically, the polymer is obtained by aging the AA-TiCl$_3$+DEAC catalyst in an inert hydrocarbon solvent of less than 1% by volume of the monomer within a preferred temperature range of 25–60° C. for a period of time of approximately one hour and thereafter injecting the aged catalyst slurry into the monomer. This improved polymerization process produces a polymer of at least one third more crystallinity than those produced by present known processes.

The catalyst employed is composed of two components, aluminum activated titanium trichloride and diethyl aluminum chloride, which must react chemically during the aging process to produce a more uniform catalyst composition from which a sterically purer polymer can be produced. It is essential for the success of this invention that the two components react with each other in the inert solvent to the fullest extent possible prior to injection into the monomer. Without this critical aging step, poly-4-methylpentene-1 of increased crystallinity cannot be obtained.

Aluminum activated titanium trichloride is a well-known commercial product. It is made by reacting TiCl$_4$ with aluminum metal at high temperatures, whereby by-product AlCl$_3$ is formed, the AlCl$_3$ remaining intimately dispersed throughout the TiCl$_3$, the TiCl$_3$:AlCl$_3$ mole ratio being about 3:1. This material is then activated by grinding it in a ball mill or the like, preferably for several days.

The ratio of catalyst to monomer used in the process of this invention is not critical. Catalyst:monomer weight ratios in the range of 1000:1 are acceptable.

EXAMPLE I

Catalyst preparation

The components of the catalyst are mixed in proportions corresponding to an AA-TiCl$_3$/DEAC mole ratio of 1:1. Specifically 0.5 gram of AA-TiCl$_3$ and 1:55 cc. of DEAC solution (concentration of 0.2 gram of DEAC/ml. of n-heptane) were added to 20 ml. of n-heptane in a vessel maintained under a nitrogen atmosphere with stirring. The dispersion was warmed to 25° C. and held at this temperature for 1 hour, after which it was used in the polymerization of 4-methylpentene-1, as set forth in Example II below.

EXAMPLE II

Polymerization of 4-methylpentene-1

The apparatus used was a 2000 ml. flask equipped with stirrer, thermometer, liquid-addition inlet, and condenser. 1200 ml. of 4-methylpentene-1 was charged to the vessel, after which the heptane dispersion of Example I was added thereto under a protective atmosphere of nitrogen. The vessel was maintained at a temperature of about 55° C. during the ensuing polymerization, which was continued with stirring for 2 hours, at the end of which time the polymerization was stopped and the polymer separated from unreacted monomer, purified in the conventional manner, and dried. Yield, 250–300 g.

The temperature required during the catalyst aging process is preferably within the range of 25–60° C. and the time of aging is approximately one hour for best results to be obtained. The time of aging will vary slightly in an inverse relationship with the temperature used (the higher the temperature, the shorter the time of aging). At room temperature, i.e., about 20° C., the time of aging can be about 1–1½ hours.

Any inert hydrocarbon selected from the saturated aliphatic, saturated cycloaliphatic, or aromatic hydrocarbons may be used in the aging process. Suitable solvents are hexane, heptane, cyclohexane, toluene, benzene, or xylene. Heptane is the preferred solvent. Only a small amount of the solvent need be used. Less than 1% by volume of the monomer is sufficient to disperse the components and to permit the chemical reaction therebetween.

The resultant poly-4-methylpentene-1 is primarily distinguished from the known polymers by a marked increase in crystallinity at room temperature. The present crystallinity of the unextracted polymer powder was determined by X-ray diffraction tests. The results are as follows:

TABLE I

| Run No. | Experimental Conditions | | | Percent Insoluble | Percent X-ray Crystallinity | Sample Form |
|---|---|---|---|---|---|---|
| | Solvent | Catalyst | Aging | | | |
| 1 | Heptane | AA-TiCl₃+DEAC | 25° C., 1 hour | 99.2 | 50.1 | Powder. |
| 2 | do | AA-TiCl₃+DEAC | 60° C., 1 hour | 87.3 | 51.5 | Do. |

Several experimental runs were also made without aging the catalyst prior to its injection into the monomer. The results of these tests were:

TABLE II

| Run No. | Experimental Conditions | | Percent Insoluble | Percent X-ray Crystallinity | Sample Form |
|---|---|---|---|---|---|
| | Polymerization | Catalyst | | | |
| 1 | Bulk | AA-TiCl₃+DEAC | 78.4 | 36.2 | Powder. |
| 2 | do | AA-TiCl₃+DEAC | 66.4 | 37.6 | Do. |
| 3 | do | AA-TiCl₃+DEAC | 73.2 | 35.8 | Do. |

Thus, a comparison of the above results clearly indicates that the poly-4-methylpentene-1 produced by the process of this invention possesses at least one third more crystallinity than the polymer produced without the critical aging of the catalyst.

Other characteristics of the polymer produced by the process of this invention are: a melting point of 242° C., a tensile strength of 3775 p.s.i. at room temperature, a high stiffness measured at room temperature of approximately 250,000 p.s.i., and a tension impact strength of 14.2 p.s.i. at room temperature. The poly-4-methylpentene-1 has a Vicat softening point of 193° C. and a density of 0.8113 gram per cubic centimeter at 23° C.

The poly-4-methylpentene-1 was subsequently extracted in n-heptane and pressed into a plaque, or film by compressing in a 1″ x 1″ x ⅛″ mold at 251° C. for 5 minutes and rapidly cooling the pressed sample in air. The percent X-ray crystallinity of the pressed sample was 80.25. This result is superior to that previously known and is obtained without a time-consuming and costly annealing process.

The results of this invention are highly surprising in view of the experimental work conducted with other 1-olefin polymers, such as polypropylene, wherein it was discovered that premixing the catalyst components prior to injection into the monomer did not produce a significant increase in crystallinity. Thus, one skilled in the art would expect the results to be the same with poly-4-methylpentene-1. The results obtained, however, clearly indicate otherwise, thereby demonstrating the great differences in the polymer produced by the method of this invention.

What is claimed is:
1. The method of polymerizing 4-methylpentene-1 monomer comprising
   (1) forming a catalyst by reacting a ground aluminum activated TiCl₃ catalyst component with diethyl aluminum chloride in an inert hydrocarbon solvent, said TiCl₃ component being an intimate dispersion of AlCl₃ in TiCl₃ in a TiCl₃:AlCl₃ mole ratio of about 3:1;
   (2) aging the catalyst formed in (1) at a temperature in the range of 25°–60° C. for about 1 hour;
   (3) injecting the aged catalyst formed in (2) into 4-methylpentene-1 monomer in a polymerization reactor;
   (4) heating the mixture of monomer and catalyst for a time sufficient to polymerize the monomer;
   (5) and recovering poly-4-methylpentene-1 having substantially improved crystallinity as compared to that prepared with un-aged catalyst.
2. The method according to claim 1 in which the inert hydrocarbon solvent is heptane and is less than 1% by volume of monomer; the aluminum activated TiCl₃ and diethyl aluminum chloride are reacted in a TiCl₃: diethyl aluminum chloride mole ratio of 1:1; and polymerization is carried out at 55° C. for a polymerization time of 2 hours.

References Cited by the Examiner

UNITED STATES PATENTS

| | | | |
|---|---|---|---|
| 2,996,459 | 8/1961 | Anderson et al. | 260—94.9 |
| 3,046,264 | 7/1962 | Tornquist | 260—93.7 |
| 3,058,963 | 10/1962 | Vandenberg | 260—88.2 |

FOREIGN PATENTS 549,891   1/1957   Belgium.

JOSEPH L. SCHOFER, *Primary Examiner.*

M. B. KURTZMAN, *Assistant Examiner.*